US011958254B2

(12) United States Patent
Du et al.

(10) Patent No.: US 11,958,254 B2
(45) Date of Patent: Apr. 16, 2024

(54) POLYETHYLENE POUCH AND THE FABRICATION METHOD THEREOF

(71) Applicant: Dow Global Technologies LLC, Midland, MI (US)

(72) Inventors: Zhe Du, Shanghai (CN); Gang Wang, Shanghai (CN); Xiaobing Yun, Shanghai (CN); Jianping Pan, Shanghai (CN); Jingyi Xu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 474 days.

(21) Appl. No.: 17/418,028

(22) PCT Filed: Dec. 28, 2018

(86) PCT No.: PCT/CN2018/124980
§ 371 (c)(1),
(2) Date: Jun. 24, 2021

(87) PCT Pub. No.: WO2020/133248
PCT Pub. Date: Jul. 2, 2020

(65) Prior Publication Data
US 2022/0088886 A1 Mar. 24, 2022

(51) Int. Cl.
*B29C 65/24* (2006.01)
*B29C 65/00* (2006.01)
(Continued)

(52) U.S. Cl.
CPC ........... *B29C 65/242* (2013.01); *B29C 65/48* (2013.01); *B29C 66/43* (2013.01); *B29C 66/71* (2013.01);
(Continued)

(58) Field of Classification Search
CPC .............. B29C 66/71; B29C 66/73115; B29C 66/73713; B29C 66/919; B29C 65/18;
(Continued)

(56) References Cited

U.S. PATENT DOCUMENTS 3,326,735 A  6/1967  Beason
5,169,696 A  12/1992 Lang et al.
(Continued)

FOREIGN PATENT DOCUMENTS

CN  1792722 A  6/2006
CN  102248735  11/2011
(Continued)

OTHER PUBLICATIONS

International Search Report & Written Opinion for related PCT Application PCT/CN2018/124980, dated Jun. 27, 2019 (10 pgs).

*Primary Examiner* — Andrew M Tecco
*Assistant Examiner* — Nicholas E Igbokwe
(74) *Attorney, Agent, or Firm* — Brooks, Cameron & Huebsch, PLLC

(57) ABSTRACT

The present disclosure is concerned with a method of forming a seal with a polyethylene based film structure. The polyethylene based film structure has at least one layer formed with an oriented polyethylene having a predetermined melting temperature ($T_m$). A conductive heat sealing device provides heat to form the seal, where a first sealing bar of the conductive heat sealing device operates at a first operating temperature of at least 10 degrees Celsius (° C.) below the $T_m$ of the oriented polyethylene in the polyethylene based film structure and a second sealing bar of the conductive heat sealing device operates at a second operating temperature of at least 15° C. higher than the operating temperature of the first sealing bar. The seal formed with the
(Continued)

polyethylene based film structure retains at least 99 percent of its original surface area prior to forming the seal.

20 Claims, 4 Drawing Sheets

(51) Int. Cl.
    *B29C 65/48*     (2006.01)
    *B29K 23/00*     (2006.01)

(52) U.S. Cl.
    CPC ...... *B29C 66/723* (2013.01); *B29C 66/73115* (2013.01); *B29C 66/7352* (2013.01); *B29C 66/73713* (2013.01); *B29C 66/8511* (2013.01); *B29C 66/91423* (2013.01); *B29C 66/919* (2013.01); *B29K 2023/0625* (2013.01); *B29K 2023/0641* (2013.01); *B29K 2995/0053* (2013.01)

(58) Field of Classification Search
    CPC ............ B29C 65/242; B29C 66/91423; B29K 2023/0641
    See application file for complete search history.

(56) References Cited

U.S. PATENT DOCUMENTS

| | | | |
|---|---|---|---|
| 5,185,203 A | | 2/1993 | Itaba et al. |
| 6,517,242 B1* | | 2/2003 | Buchman ............... B31B 70/00 |
| | | | 493/213 |
| 6,846,551 B2 | | 1/2005 | Genske et al. |
| 8,225,583 B2 | | 7/2012 | Waldherr et al. |
| 8,563,102 B2 | | 10/2013 | Breck et al. |
| 10,611,122 B2 | | 4/2020 | Franca et al. |
| 10,717,833 B2 | | 7/2020 | Bilgen et al. |
| 10,723,084 B2 | | 7/2020 | Hintz et al. |
| 10,792,899 B2 | | 10/2020 | Pan et al. |
| 2003/0097825 A1* | | 5/2003 | Nakanishi ......... B29C 66/91951 |
| | | | 53/373.7 |
| 2005/0250636 A1 | | 11/2005 | Slenders |
| 2010/0209640 A1 | | 8/2010 | Yun |
| 2012/0033901 A1 | | 2/2012 | Votaw |
| 2013/0340917 A1 | | 12/2013 | Carbonell |
| 2014/0260109 A1* | | 9/2014 | McGhee ........... B29C 66/43121 |
| | | | 53/469 |
| 2015/0314919 A1* | | 11/2015 | Wilkes ............. B29C 66/91423 |
| | | | 156/308.2 |
| 2017/0029583 A1* | | 2/2017 | Lin .......................... B32B 27/08 |
| 2017/0120552 A1* | | 5/2017 | Franca .................... B29C 65/18 |
| 2018/0086528 A1* | | 3/2018 | Ma .................... B29C 66/73921 |
| 2018/0099492 A1 | | 4/2018 | Yun et al. |
| 2018/0134432 A1 | | 5/2018 | Babini |
| 2018/0147791 A1 | | 5/2018 | Hintz et al. |
| 2018/0370202 A1 | | 12/2018 | Niedersüss et al. |

FOREIGN PATENT DOCUMENTS

| | | |
|---|---|---|
| CN | 105800004 | 7/2016 |
| GB | 1319232 | 6/1973 |
| JP | 2014046959 | 3/2014 |
| WO | 9903731 | 1/1999 |

\* cited by examiner

POLYETHYLENE POUCH AND THE FABRICATION METHOD THEREOF

This application is a National Stage Application under 35 U.S.C. § 371 of International Application Number PCT/CN2018/124980, filed Dec. 28, 2018 and published as WO 2020/133248 A1 on Jul. 2, 2020, the entire contents of which are incorporated herein by reference in its entirety

FIELD OF DISCLOSURE

The present disclosure relates generally to forming a seal with polyethylene based film structures and more particularly to methods of forming the seal with polyethylene based film structures using conductive heat sealing methods.

BACKGROUND

Sustainability is an important topic in the packaging arts, especially for the area of flexible packaging. Most of the flexible packaging materials are laminated structures, where single-material structures are now drawing much attention from both brand owners and converters due to the sustainability pressure. For example, polyethylene based film structures (e.g., full-polyethylene (PE) based structures) are one promising type single-material structure for use in flexible packaging if mechanical and optical properties could be incorporated with sealant capability in a full-PE based structure.

A tenter frame biaxially orientation process endows PE with excellent optical appearance and tensile properties enabling a polyethylene=based film structure to be fully recyclable and provide environmentally sustainable packaging. Lamination of biaxially oriented polyethylene (BOPE) to another sealant layer (e.g. a blown film PE) is an example of the polyethylene based film structure having great potential in various applications such as detergent powder packaging, rice bags, pet food packaging, condiment packaging and also frozen food packaging.

A bottleneck, however, making it difficult for polyethylene based film structure to be used as packages was encountered in forming seals using a conductive heat sealing method. The conductive heat sealing method uses a pair of constantly heated "jaws" that physically press and heat the polymers of the laminated structure to form a seal. The pattern of the seal helps to form flexible packaging materials using the laminated structures. However, the intrinsically inferior resistance to heat makes PE films susceptible to heat induced deformations (e.g., wrinkles), which is undesirable. Severe shrinking has been observed in PE films that have been oriented during the converting process (e.g., during the tenter frame biaxially orientation process) if the temperatures used in the constantly heated jaws of the conductive heat sealing method are even close to the melt point of oriented PE film. As a result, shrinkage of oriented films and the consequent wrinkling of the polyethylene based film structure is a problem with conductive heat sealing processes.

Blown PE films also deform during conductive heat sealing even though the amount of orientation imparted by the blowing process is less than that seen in the orientation process (e.g., tenter frame biaxially orientation process). Experience also teaches that if the deformation (shrinking) temperature of the polyethylene based film structure is too close to the heat sealing initiation temperature (HSIT) of the sealant PE there will be no adequate temperature "window" to make a strong seal without deforming the polyethylene based film structure. This hurdle, however, is not an issue for other conventional lamination film structures like those made from polyamine (PA, e.g., nylon)/PE or PET (polyethylene terephthalate)/PE, as PA and PET has much higher melting point and deformation temperature than PE. As a result, polyethylene based film structures having one or more layers of oriented PE are highly susceptible to wrinkling in and around seals formed during conductive heat sealing processes.

Apart from conductive heat sealing, there are other sealing technologies. For example, an impulse sealing process continues to apply pressure along the seal while the system cools (water or air-cooled) the film forming the seal in an attempt to prevent deformation after the sealing jaws are opened. This technique finds applications in shrink films. However, the overall cost of impulse sealing based packaging machine is substantially higher than the conductive heat sealing system. The maintenance cost of the impulse sealing process are also higher than conductive heat sealing systems, as the Nichrome wire and release coverings of the impulse sealing process require frequent replacement. The productivity of the impulse sealing process is also lower than the conductive heat sealing system and seal pattern is restricted to narrow band seal with less than a 5 mm width. Therefore, machines with impulse sealing are not often used in making conventional packaging such as pillow pouch and 3-side sealed bags, among other structures.

Another similar but simpler technique is the hot wire sealing method, but this method is not reliable for hermeticity as there is often "burn-through" in trying to form a seal. Additional sealing technologies are also known that avoid the use of direct heating on the polymer film. For example, ultrasonic sealing uses mechanical vibrations at the sealing interface. Radio frequency sealing uses high frequency electrical field to heat up polar components, like using sealing resins. Induction sealing is useful on laminate structures with metal layer (like Al foils) which heat up the metal by electromagnetic field. All the above mentioned methods, however, suffer from the feasibility to be used on full-PE structure and also the cost and availability of equipment.

As such, there continues to be a need in the art for a method for forming a seal with a polyethylene based film structure that does not induce shrinking in the polyethylene based film structure, thereby reducing or eliminating the formation of wrinkles in the polyethylene based film structure.

SUMMARY

The present disclosure provides a method for forming a seal with a polyethylene (PE) based film structure that imparts little to no shrinking in the polyethylene based film structure, thereby reducing or eliminating the formation of wrinkles in the PE based film structure. Specifically, the present disclosure is concerned with a method of forming a seal with a PE based film structure in which the method includes providing the PE based film structure, where the polyethylene based film structure has at least one layer formed with an oriented polyethylene having a predetermined melting temperature ($T_m$); providing a conductive heat sealing device having a first sealing bar and a second sealing bar to provide heat to form the seal; operating the first sealing bar of the conductive heat sealing device at a first operating temperature of at least 10 degrees Celsius (° C.) below the $T_m$ of the oriented polyethylene forming at least one layer of the polyethylene based film structure;

operating the second sealing bar of the conductive heat sealing device at a second operating temperature of at least 15° C. higher than the operating temperature of the first sealing bar; and forming the seal with the polyethylene based film structure with the first sealing bar and the second sealing bar of the conductive heat sealing device.

For the various embodiments, the temperature at which the sealing bars operate can be modified, where the method of operating the first sealing bar of the conductive heat sealing device at the first operating temperature includes operating the first sealing bar of the conductive heat sealing device at the first operating temperature of at least 15° C. below the $T_m$ of the oriented polyethylene forming at least one layer of the polyethylene based film structure; and where operating the second sealing bar of the conductive heat sealing device at the second operating temperature includes operating the second sealing bar of the conductive heat sealing device at the second operating temperature of at least 25° C. higher than the operating temperature of the first sealing bar.

Providing the polyethylene based film structure having the at least one layer formed with the oriented polyethylene includes, in one embodiment, providing the polyethylene based film structure having at least one layer formed with a biaxial oriented polyethylene. For example, the biaxially oriented polyethylene is oriented in the machine direction at a draw ratio from 2:1 to 9:1 and in the cross direction at a draw ratio from 1:1 to 10:1. In other embodiments, providing the polyethylene based film structure having the at least one layer formed with the oriented polyethylene includes providing the polyethylene based film structure having at least one layer formed with a monoaxial oriented polyethylene. In addition, the oriented polyethylene (e.g., biaxial oriented polyethylene and/or monoaxial oriented polyethylene) can have a density of 0.910 to 0.970 g/cm³. For example, the oriented polyethylene can be a linear low density or medium density polyethylene having a density of 0.910 to 0.940 g/cm³.

For the embodiments, the polyethylene based film structure can have a thickness of 30 to 200 micrometer (μm). In addition, providing the polyethylene based film structure can include providing the polyethylene based film structure that is formed only with the oriented polyethylene. Providing the polyethylene based film structure can also include providing the polyethylene based film structure having a monolayer structure formed only with one of the at least one oriented polyethylene layer. Alternatively, providing the polyethylene based film structure can include providing the polyethylene based film structure having a multilayer structure formed with at least one layer formed with the oriented polyethylene. For example, the at least one layer formed with the oriented polyethylene can form a skin layer of the polyethylene based film structure.

For the various embodiments, the multilayer structure can further include an adhesive layer and a sealant layer, where the sealant layer is laminated to the at least one layer formed with the oriented polyethylene by the adhesive layer. For such embodiments, the second operating temperature for the second sealing bar is greater than the heat seal initiation temperature of the sealant layer.

Providing the polyethylene based film structure having the at least one layer formed with the oriented polyethylene can also include providing the polyethylene based film structure where at least 50 percent of the structural units of the polyethylene based film structure are from polyethylene. Alternatively, providing the polyethylene based film structure having the at least one layer formed with the oriented polyethylene can include providing the polyethylene based film structure where at least 70 percent of structural units of the polyethylene based film structure are from polyethylene.

Forming the seal with the surfaces of the polyethylene based film structure between the first sealing bar and the second sealing bar of the conductive heat sealing device includes contacting the polyethylene based film structure with the first sealing bar and the second sealing bar of the conductive heat sealing device for a sealing dwell time in a range of 0.1 to 3 seconds to form the seal.

The present disclosure also provides for an article formed from the polyethylene based film structure as discussed herein. The seal formed with the polyethylene based film structure according to the present disclosure retains at least 99 percent of its original surface area prior to forming the seal. In addition, the seal formed with the polyethylene based film structure has a surface area that is at least 90 percent of a surface area of the first sealing bar and the second sealing bar that contacts the polyethylene based film structure while forming the seal. The seal formed according to the present disclosure can has a seal strength of 20 N/inch (7.87 N/cm) to 200 N/inch (78.74 N/cm). In an additional embodiment, the seal formed according to the present disclosure can has a seal strength of 5 N/inch (1.97 N/cm) to 25 N/inch (9.84 N/cm), which is suitable for use in "easy" peel packaging applications. Articles that can be formed according to the present disclosure include, among others, are selected from the group consisting of a pillow pouch, a 3-side sealed bag, a 4-side sealed bag and a stand-up pouch, as are known in the art.

DETAILED DESCRIPTION

Figure 1:
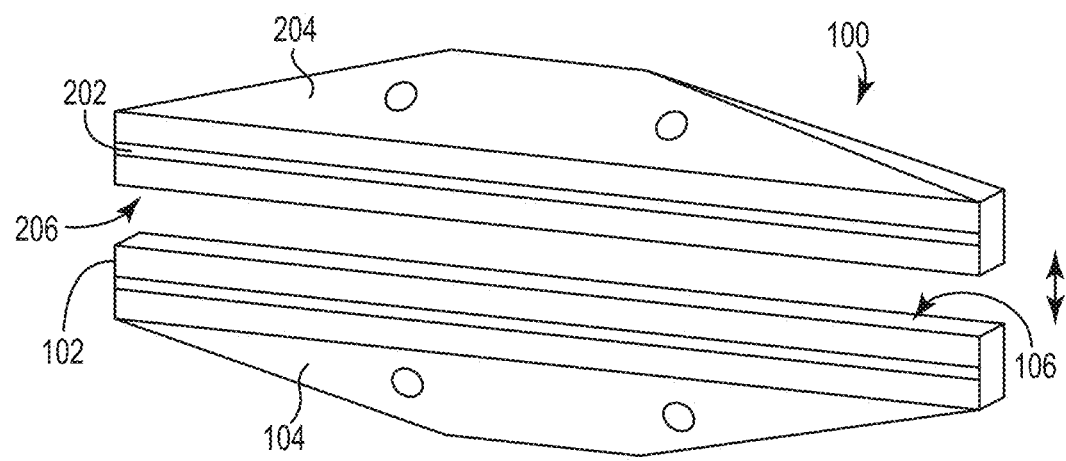
FIG. 1 is a perspective view of opposing seal bars in accordance with an embodiment of the present disclosure.

The present disclosure provides a method for forming a seal with a polyethylene (PE) based film structure that imparts little to no shrinking in the PE film, thereby reducing or eliminating the formation of wrinkles in the PE based film structure. Specifically, the present disclosure is concerned with a method of forming a seal with a PE based film structure in which the method includes providing the PE based film structure, where the polyethylene based film structure has at least one layer formed with an oriented polyethylene having a predetermined melting temperature ($T_m$); providing a conductive heat sealing device having a first sealing bar and a second sealing bar to provide heat to form the seal; operating the first sealing bar of the conductive heat sealing device at a first operating temperature of at least 10 degrees Celsius (° C.) below the $T_m$ of the oriented polyethylene forming at least one layer of the polyethylene based film structure; operating the second sealing bar of the conductive heat sealing device at a second operating temperature of at least 15° C. higher than the operating temperature of the first sealing bar; and forming the seal with the polyethylene based film structure with the first sealing bar and the second sealing bar of the conductive heat sealing device.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight, all temperatures are in ° C., and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792 with values reported in grams per cubic centimeter (g/cm$^3$).

A "polyethylene based film structure," as used herein is a film structure (e.g., monolayer structure or multilayer structure) that includes at least 50 percent of the structural units forming the film structure being derived from polymerized ethylene monomers (based on the total amount of polymerizable monomers) and, optionally, may contain at least one comonomer.

A "propylene-based polymer" is a polymer that contains more than 50 mole percent polymerized propylene monomer (based on the total amount of polymerizable monomers) and, optionally, may contain at least one comonomer.

"Melting point" as used herein (also referred to as a melting peak in reference to the shape of a plotted DSC curve) is measured according to ASTM D 3418. While many individual polyolefins will comprise only one melting point or peak, it should be noted that many blends comprising two or more polyolefins will have more than one melting point or peak. As used herein, the "predetermined melting temperature (Tm)" is taken as the highest endothermic peak of the DSC measurement of the oriented polyethylene as measured according to ASTM D3418.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

"Polypropylene" means a polymer having greater than 50 wt % units derived from propylene monomer.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

"Polyethylene" shall mean polymers comprising greater than 50% by weight of units which have been derived from ethylene monomer. This includes polyethylene homopolymers or copolymers (meaning units derived from two or more comonomers).

Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm$^3$.

The term "LLDPE", includes resins made using the traditional Ziegler-Natta catalyst systems as well as single-site catalysts such as bis-metallocenes (sometimes referred to as "m-LLDPE"), post-metallocene catalysts, and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272, 236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076, 698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.940 g/cm$^3$. "MDPE" is typically made using chromium or Ziegler-Natta catalysts or using metallocene, constrained geometry, or single site catalysts, and typically have a molecular weight distribution ("MWD") greater than 2.5.

The term "HDPE" refers to polyethylenes having densities greater than about 0.940 g/cm$^3$, which are generally prepared with Ziegler-Natta catalysts, chrome catalysts, post-metallocene catalysts, or constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

Certain polymers are characterized as being prepared in the presence of a "single-site catalyst" or as being "single-site catalyzed." Three major families of high efficiency single-site catalysts (SSC) have been commercially used for the preparation of polyethylene copolymers. These are bis-cyclopentadienyl single-site metallocene catalyst (also known as a Kaminsky catalyst), a half sandwich, constrained geometry mono-cyclopentadienyl single-site catalyst (known as a Constrained Geometry Catalyst, CGC, under the trademark of INSITE™ technology by The Dow Chemical Company), and post-metallocene catalysts. It should be understood that polymers characterized as being prepared in the presence of a single-site catalyst or as single-site catalyzed were prepared in the presence of one or more of such catalysts.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The "oriented polyethylene" used as the at least one layer in the polyethylene based film structure of the present disclosure is either a biaxial oriented film or a monoaxial oriented film formed according to solid-phase orientation processes as are known in the art. Forming the oriented polyethylene of the present disclosure as a biaxial oriented film is the result of a solid-phase orientation process through known processes that occur after a plasticating extruder feeds a molten polyethylene film (a first module) to chill and surface finishing rolls that, after quenching and stabilizing the temperature of the molten polyethylene film to achieve a solid-phase, orient (stretch) the film in the solid-phase proportionally to the desired orientation or stretch ratios in the machine direction (MD) and cross-machine direction (CD) for biaxial orientation. Examples of this process to form a biaxial oriented polyethylene used as at least one layer in the polyethylene based film structure of the present disclosure include flat biaxial orientation (e.g., the tenter frame line process), simultaneous flat film biaxial orientation and simultaneous tubular film biaxial orientation (the "double-bubble" process) as are known in the art. Forming the oriented polyethylene of the present disclosure as a monoaxial oriented film is the result of a solid-phase orientation process through known processes that occur solely in either the MD (termed MDO) or in the CD (termed TDO). TDO is typically accomplished using a tenter frame and oven section like that used for the CD orientation step of biaxial flat film orientation. MDO is also similar to that of the MD orientation step in biaxial orientation, where post-quenched film is temperature-conditioned and stretched between a pair of differential speed rollers in close proximity to minimize the unsupported gap where orientation occurs. Any orientation of the polyethylene film prior to achieving a solid-phase is not considered to be an "oriented polyethylene" according to the present disclosure.

The present disclosure provides and uses a conductive heat sealing device having a first sealing bar and a second sealing bar to provide heat to form the seal with the PE based film structure provided herein. FIG. 1 provides an example of a portion of the conductive heat sealing device 100 having a first sealing bar 102 and a second sealing bar 202. The first sealing bar 102 and/or the second sealing bar 202 each may be individually referred to as a "seal bar," or collectively as "seal bars." The first sealing bar 102 opposes the second sealing bar 202 as shown in FIG. 1. For the various embodiments, the first sealing bar 102 and the second sealing bar 202 are the same, or substantially the same, with the second sealing bar 202 positioned opposite each other in order to perform a heat sealing operation.

A "sealing bar," as used herein, is a component of a conductive heat sealing device. A seal bar is one member in a pair of rigid and elongated members made of a thermally conductive material (typically a metal) used in a heat sealing operation. The term "heat sealing," or "heat sealing operation," as used herein, is the act of placing two or more films of polymeric material (e.g., the PE based film structure as provided herein, along with optional fitment and/or tubing structures) between two opposing seal bars. The seal bars are moved toward each other, sandwiching the films, to apply heat and pressure to the films such that opposing interior surfaces (seal layers) of the films contact and form a heat seal, or form a weld, to attach the films to each other. A "conductive heat sealing device," as used herein, includes suitable structure, mechanism, and control (i) to heat the seal bars and independently control the temperature of each of the seal bars, (ii) to move the seal bars toward and away from each other between an open position and a closed position, and (iii) to apply a sealing pressure and control the sealing pressure and duration of the sealing pressure in order to weld the films to each other thereby forming the seal with the PE based film structure.

Referring again to FIG. 1, it is understood that second sealing bar 202 has the same components as the first sealing bar 102, with the description of first sealing bar 102 applying equally to second sealing bar 202. The reference numerals for the second sealing bar 202 are the same as the reference numerals for the components of the first sealing bar 102, with the understanding that the components for the second sealing bar 202 will begin with the numeral "2." For example, second sealing bar 202 is a second seal bar with the same structure and geometry as first sealing bar 102, second sealing bar 202 disposed in mirror image relation with respect to first sealing bar 102. The second sealing bar 202 has the same structure as first sealing bar 102 and the first digit "2" in the reference numeral for seal bar "202" designating the "second" second sealing bar 202.

The first sealing bar 102 includes a base member 104 having a flat front surface 106. Correspondingly, the second sealing bar 202 has a base member 204 with a flat front surface 206. In an alternative embodiment, the base member 104 and 204 can each have a serrated or textured surface, as are known in the art. It is appreciated that the first sealing bar 102 and/or the second sealing bar 202 can have a different and/or additional surface configuration in addition to or in place of the flat surface seen in the example shown in FIG. 1. For example, the first sealing bar 102 and/or the second sealing bar 202 can each further include a flat recessed surface relative the flat front surfaces 106 and 206 to allow for a fitment to be used in making the articles with the PE based film structure as provided herein. As appreciated, the flat recessed surfaces would be sufficient to allow for the closure of seal bars with the collapsed fitment and films inside and also provide contact pressure at the concave surfaces of the seal bar to the fitment and films. For the various embodiments, an example of a fitment includes a tube member, which is an elongated hollow cylinder for transporting a flowable material.

In addition, the base member 104 and 204 could have a non-flat front surface as desired. For example, base member 104 could have a concave surface that receives a corresponding convex surface of the base member 204. Other shapes and/or configurations for the base member 104 and 204 are possible. It is also appreciated that the first sealing bar 102 and the second sealing bar 202 need not have a linear or straight configuration (radius of curvature of 0) as seen in FIG. 1, but may have a non-zero radius of curvature so as to provide base members 104 and 204 having a curved configuration. Such curved configurations can include, but are not limited to arcs, semi-circles, circles (e.g., complete circles), semi-ovals, ovals (complete oval), semi-ellipse, and ellipse (e.g., complete ellipses, which exclude circles) among others.

In an embodiment, flat front faces 106 and 206 can each have the same width, taken perpendicularly along the longitudinal axis of the flat front face 106 and 206 of 2.0 mm to 25 mm. Other ranges and/or values are possible for the width of the flat front faces 106 and 206. Examples include, but are not limited to, 2.0 mm, 4.0 mm, 6.0 mm, 8.0 mm, 10.0 mm, 12.0 mm, 14.0 mm, 16.0 mm, 18.0 mm, 20.0 mm, 22.0 mm, 24.0 mm and 25.0 mm.

The conductive heat sealing device 100 includes the first sealing bar 102 and the second sealing bar 202. The first sealing bar 102 and the second sealing bar 202 have the same, or substantially the same structure, geometry, and construction as previously disclosed. The first sealing bar 102 and the second sealing bar 202 oppose each other such that the flat front surface 106 of the first sealing bar 102 faces the flat front surface 206 of the second sealing bar 202 as shown in FIG. 1. The second sealing bar 202 is in mirror-image orientation with respect to first seal bar 102.

In alternative embodiment, the conductive heat sealing device can take the form of a pillow type packaging machine for forming the PE based film structure into a pillow shape for use as a pillow packaging bag. As appreciated by one skilled in the art, the pillow type packaging machine can be a vertical pillow type packaging machine (consecutive vertical packer), as are known. In this embodiment, a bag making guide shapes the PE based film structure into a cylindrical shape around the outer circumference of an input pipe, thought which the contents of the resulting pillow packaging bag are dispensed. A seal is formed along overlapped portions of the PE based film structure using the first sealing bar and the second sealing bar of the conductive heat sealing device to form a vertical seal in creating the cylindrical shape of the pillow packaging bag. In this embodiment, the first sealing "bar" and the second sealing "bar" forming the vertical seal are configured as a first sealing "roller" and a second sealing "roller", respectively, both providing heat and pressure in forming the vertical seal. As discussed herein, the temperature at which the first sealing roller (i.e., the first sealing bar) and the second sealing roller (i.e., the second sealing bar) operate can be independently controlled and set to allow for the seal according to the present disclosure to be formed. A second pair of sealing bars of the conductive heat sealing device positioned laterally relative to the longitudinal axis of the cylindrical shape of the pillow packaging bag is then used to form a seal in the cylindrical film in a prescribed position in the lateral direction to form the lateral seals. As discussed herein, the temperature at which the first sealing bar and the second sealing bar used in forming the seal in the lateral direction can be independently controlled and set to allow for the seal according to the present disclosure to be formed. A cutting device is then used for cutting the regions of the lateral seals heat sealed by the second pair of sealing bars of the conductive heat sealing device. The cutting apart can be accomplished at the same time as the formation of the lateral seals. Other known conductive heat sealing devices can use the method of the present disclosure.

For the various embodiments provided herein, forming the seal with the surfaces of the polyethylene based film structure between the first sealing bar and the second sealing bar of the conductive heat sealing device includes contacting the polyethylene based film structure with the first sealing bar and the second sealing bar of the conductive heat sealing device for a sealing dwell time in a range of 0.1 to 3 seconds to form the seal. Other sealing dwell times include a duration from 0.2 seconds, or 0.5 seconds, or 0.75 seconds, to 3.0 seconds, or 2.0 seconds, or 1.0 seconds.

The pressure applied by the first sealing bar and the second sealing bar in forming the seal (seal force) can be from 1 Mega Pascals (MPa) to 2 MPa. Other sealing pressures include a pressure from 1 MPa, or 1.1 MPa, or 1.2 MPa, or 1.3 MPa, to 2 MPa, or 1.9 MPa, or 1.8 MPa, or 1.7 MPa. Other sealing dwell times and/or pressures are possible, where the values of the duration of the sealing dwell time and/or the pressure used in forming the seal can be a function of the composition of polyethylene based film structure and/or the thickness of the polyethylene based film structure.

As discussed herein, the present disclosure provides a method for forming a seal with a PE based film structure that imparts little to no shrinking in the PE film, thereby reducing or eliminating the formation of wrinkles in the PE based film structure. The method of forming the seal with the PE based film structure includes providing the PE based film structure, where the polyethylene based film structure has at least one layer formed with an oriented polyethylene having a predetermined melting temperature ($T_m$); providing the conductive heat sealing device 100 having the first sealing bar 102 and the second sealing bar 202, as discussed herein, to provide heat to form the seal; operating the first sealing bar 102 of the conductive heat sealing device 100 at a first operating temperature of at least 10 degrees Celsius (° C.) below the $T_m$ of the oriented polyethylene forming at least one layer of the polyethylene based film structure; operating the second sealing bar 202 of the conductive heat sealing device 100 at a second operating temperature of at least 15° C. higher than the operating temperature of the first sealing bar 102; and forming the seal with the polyethylene based film structure with the first sealing bar and the second sealing bar of the conductive heat sealing device 100.

As noted above, the present process includes positioning the PE based film structure between the opposing seal bars 102 and 202 as shown in FIG. 1. The present process includes forming a seal with the PE based film structure with the opposing heated seal bars. The term "sealing" or "forming a seal" is the act of compressing overlapping portions of the PE based film structure with opposing seal bars 102 and 202 such that opposing portions of the overlapped PE based film structure contact, or otherwise touch, each other under pressure and with heat as provided by the opposing seal bars 102 and 202. The conductive heat sealing device includes suitable structure and mechanism to move the seal bars 102 and 202 toward and away from each other in order to perform a heat sealing procedure as disclosed herein.

For the various embodiments, the temperature at which the sealing bars operate can be modified, where the method of operating the first sealing bar of the conductive heat sealing device at the first operating temperature includes operating the first sealing bar of the conductive heat sealing device at the first operating temperature of at least 15° C. below the $T_m$ of the oriented polyethylene forming at least one layer of the polyethylene based film structure; and where operating the second sealing bar of the conductive heat sealing device at the second operating temperature includes operating the second sealing bar of the conductive heat sealing device at the second operating temperature of at least 25° C. higher than the operating temperature of the first sealing bar. Other values for the temperature at which the sealing bars operate are also possible, where the first sealing bar of the conductive heat sealing device operates at a temperature this is below the $T_m$ of the oriented polyethylene forming at least one layer of the polyethylene based film structure and the second sealing bar of the conductive heat sealing device operates at a temperature this is above the $T_m$ of the oriented polyethylene forming at least one layer of the polyethylene based film structure, where the exact temperatures used for the first sealing bar and the second sealing bar are determined based on whether wrinkles are formed when a seal is formed with the polyethylene based film structure.

The seal formed with the polyethylene based film structure according to the present disclosure retains at least 99 percent of its original surface area prior to forming the seal. In an additional embodiment, the seal formed with the polyethylene based film structure can have a surface area that is at least 90 percent of a surface area of the first sealing bar and the second sealing bar that contacts the polyethylene based film structure while forming the seal. While not wishing to be bound by theory, it is believed that the ability to prevent deformation (e.g., wrinkles) along the seal is related to preventing or minimizing at least a portion of the oriented polyethylene in the polyethylene based film structure forming the seal from either melting or achieving a temperature at which the polyethylene based film structure deforms during the sealing process. This is objective is believed to be accomplished by having the first sealing bar of the conductive heat sealing device operating at a temperature below the $T_m$, as provided herein, of the oriented polyethylene forming at least one layer of the polyethylene based film structure so as to help stabilize the shape and size of the seal being formed in conjunction with the second sealing bar operating at a temperature above the $T_m$ of the oriented polyethylene. It is believed this stabilization helps to reduce or eliminate the deformation of the seal that would otherwise occur if the sealing bars where both operating at the same temperature at or very near the $T_m$ of the oriented polyethylene forming at least one layer of the polyethylene based film structure.

For the various embodiments provided herein, the seal formed according to the present disclosure can has a seal strength of 20 N/inch (7.87 N/cm) to 200 N/inch (78.74 N/cm). In an additional embodiment, the seal formed according to the present disclosure can has a seal strength of 5 N/inch (1.97 N/cm) to 25 N/inch (9.84 N/cm), which are suitable for use in "easy" peel packaging applications. Seal strength testing is as described in the Examples section of the present application.

The polyethylene based film structure useful in the present disclosure includes at least one layer formed with an oriented polyethylene. For the various embodiments provided herein, at least 50 percent of the structural units of the polyethylene based film structure are from polyethylene. Alternatively, at least 70 percent of the structural units of the polyethylene based film structure are from polyethylene. As discussed herein, the oriented polyethylene used in forming the at least on layer can be a biaxially oriented polyethylene. Alternatively, the oriented polyethylene used in forming the at least on layer can be a monoaxially oriented polyethylene. It is also possible that the polyethylene based film structure includes at least one layer of a biaxially oriented polyethylene and at least one layer of a monoaxially oriented polyethylene.

The polyethylene based film structure can also be formed of a single layer. In other words, the polyethylene based film structure is a monolayer structure. For the single layer structure, the polyethylene based film structure is formed with only a single layer of the biaxially oriented polyethylene or only a single layer of the monoaxially oriented polyethylene. In other words, the polyethylene based film structure is formed as a monolayer structure only with the oriented polyethylene. For such embodiments, the polyethylene-based polymer used in forming the single layer structure can be selected form the group consisting of homopolymers or interpolymers (e.g. copolymer) of any one of LDPE, LLDPE, ULDPE, VLDPE, MDPE and HDPE.

For the various embodiments, the oriented polyethylene layer can be oriented in the machine direction at a draw ratio of 2:1 to 9:1, or in the alternative, at a draw ratio of 3:1 to 5:1. The oriented polyethylene layer can, in some embodiments, can be oriented in the cross direction at a draw ratio of 1:1 to 10:1, or in the alternative, at a draw ratio of 3:1 to 8:1. In some embodiments, the oriented polyethylene layer is biaxially oriented, where the biaxially oriented polyethylene is oriented in the machine direction at a draw ratio from 2:1 to 9:1 and in the cross direction at a draw ratio from 1:1 to 10:1. In addition embodiments, the oriented polyethylene layer is monoaxially oriented, where the monoaxially oriented polyethylene is oriented in either the machine direction at a draw ratio from 2:1 to 9:1 or in the cross direction at a draw ratio from 1:1 to 10:1.

In an additional embodiment, the polyethylene based film structure can be a multilayer structure (e.g., formed of two or more layers) formed of the same polyethylene-based polymer, where at least one of the layers is an oriented polyethylene layer, as provided herein. For such embodiments, the polyethylene-based polymer used in forming the multi-layer structure can be selected form the group consisting of homopolymers or interpolymers (e.g. copolymer) of any one of LDPE, LLDPE, ULDPE, VLDPE, MDPE and HDPE.

Alternatively, the polyethylene based film structure is a multilayer structure (e.g., formed of two or more layers), where at least one of the layers is an oriented polyethylene layer, as provided herein. The two or more layers forming the multilayer structure of the polyethylene based film structure can be formed from the same polyethylene-based polymer, where at least one of the two or more layers is an oriented polyethylene as discussed herein. In an addition embodiment, the multilayer structure for the polyethylene based film structure includes at least one layer formed from a first polyethylene-based polymer and at least one layer formed from a second polyethylene-based polymer, where the first polyethylene-based polymer is a different structural form and/or compositional form of polyethylene-based polymer as compared to the second polyethylene-based polymer. For example, the first polyethylene-based polymer can be selected from the group consisting of homopolymers or interpolymers (e.g. copolymers) of any one of LDPE, LLDPE, ULDPE, VLDPE, MDPE and HDPE, while the second polyethylene-based polymer is selected from the group that remains after removing the polyethylene-based polymer selected for the first polyethylene-based polymer.

Alternatively, the first polyethylene-based polymer can be selected from the group consisting of homopolymers or interpolymers (e.g. copolymers) of any one of LDPE, LLDPE, ULDPE, VLDPE, MDPE and HDPE, while the second polyethylene-based polymer is selected from the same group except that either one of the structural form or compositional form of the second polyethylene-based polymer is different than the first polyethylene-based polymer. For example, the first polyethylene-based polymer could be a LDPE homopolymer having a density of 0.920 g/cm$^3$ while the second polyethylene-based polymer is also a LDPE homopolymer, but having a density of 0.940 g/cm$^3$.

The polyethylene based film structure can be formed as the multilayer structure using techniques known to those of skill in the art. For example, for those layers that can be coextruded, such layers can be coextruded as blown films or cast films using techniques known to those of skill in the art. In particular, based on the compositions of the different film layers disclosed herein, blown film manufacturing lines and cast film manufacturing lines can be configured to coextrude multilayer structures to provide the polyethylene based film structure discussed herein. Such a coextrusion can be accomplished in a single step, if so desired, using techniques known to those of skill in the art.

In some embodiments, the oriented polyethylene layer can be biaxially oriented using a sequential biaxial orientation process, like tenter frame orientation process. Such techniques are generally known to those of skill in the art. In other embodiments, the oriented polyethylene layer can be biaxially oriented using other techniques known to those of skill in the art, such as simultaneous biaxial orientation process, like double bubble processes. In other embodiments, the oriented polyethylene layer can be uniaxial oriented using other techniques known to those of skill in the art, such as machine direction orientation processes. In general, with a Tenter frame sequential biaxial orientation process, the Tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a Tenter frame hot air oven with heating zones to carry out stretching in the cross direction. The first several zones are for pre-heating, followed by zones for stretching, and then the last zones for annealing. Monoaxial orientation is accomplished by stretching in only one of either the machine direction or the cross direction.

Embodiments of the polyethylene based film structure having the multilayer structure can also be in the form of a laminate. In such embodiments, the laminate comprises at least one layer that is an oriented polyethylene layer, as provided herein. One or more additional layers are laminated to the oriented polyethylene layer, where the one or more additional layers can be, for example, formed of the polyethylene-based polymer selected form the group consisting of homopolymers or interpolymers (e.g. copolymer) of any one of LDPE, LLDPE, ULDPE, VLDPE, MDPE and HDPE. One or more of the additional layers can, if desired, be an oriented polyethylene layer, as provided herein. Lamination of the polyethylene based film structure can be accomplished using techniques known to those of skill in the art such as, for example, dry lamination, solvent-less lamination, extrusion lamination, and other techniques.

For the various embodiments, the polyethylene based film structure having the multilayer structure can include an adhesive layer and a sealant layer, where the sealant layer is laminated to the at least one layer formed with the oriented polyethylene by the adhesive layer. For such embodiments, the second operating temperature for the second sealing bar is greater than the heat seal initiation temperature of the sealant layer. For embodiments of the multilayer structure provided herein, the at least one layer formed with the oriented polyethylene can form a skin layer of the polyethylene based film structure.

In general, the adhesive layer can comprise any adhesive suitable for laminating sealant films to polyethylene films. The adhesive layer can comprise a solventless adhesive, a waterborne adhesive, or a solvent-borne adhesive. The biaxially oriented polyethylene film and the sealant film can be laminated using a dry or wet or solventless lamination process using techniques known to those of skill in the art based on the teachings herein.

The weight or thickness of the adhesive layer can depend on a number of factors including, for example, the thickness of the biaxially oriented polyethylene film, the thickness of the sealant film, the desired thickness of the multilayer structure, the type of adhesive used, and other factors. In some embodiments, the adhesive layer is applied at up to 5.0 grams/m$^2$, or from 1.0 to 4.0 g/m$^2$, or from 2.0 to 3.0 g/m$^2$.

Polyethylene can be particularly desirable as it can permit the coextrusion of the adhesive layer with the sealant layer. In such embodiments, the adhesive layer can comprise polyethylene known to those of skill in the art to be suitable for use as a layer in a multilayer film based on the teachings herein. For example, the polyethylene that can be used in the adhesive layer, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), enhanced polyethylenes, and others, including blends thereof.

In general, the sealant layer can be formed from polyethylene or polyethylene blend known to those of skill in the art. Polyethylene can be particularly desirable as it can permit the coextrusion of the sealant layer with the adhesive layer. In such embodiments, the sealant layer can comprise polyethylene known to those of skill in the art to be suitable for use as a layer in a multilayer film based on the teachings herein. For example, the polyethylene that can be used in the sealant layer, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), enhanced polyethylenes, and others, including blends thereof.

For the various embodiments, the oriented polyethylene (e.g., biaxial oriented polyethylene and/or monoaxial oriented polyethylene) can have a density of 0.910 to 0.970 g/cm$^3$. All individual values and subranges from 0.910 g/cm$^3$ to 0.970 g/cm$^3$ are included herein and disclosed herein; for example, the density of the oriented polyethylene can be from a lower limit of 0.910, 0.913, 0.915, 0.918, 0.920, 0.922, 0.925, 0.928, or 0.930 g/cm$^3$ to an upper limit of 0.940, 0.950, 0.960, 0.965, or 0.970 g/cm$^3$. In some embodiments, the oriented polyethylene can be a LLDPE or a MDPE having a density of 0.910 to 0.940 g/cm$^3$.

It should be understood that any of the foregoing layers for the polyethylene based film structure can further comprise one or more additives as known to those of skill in the art such as, for example, antioxidants, ultraviolet light stabilizers, thermal stabilizers, slip agents, antiblock, antistatic agents, pigments or colorants, processing aids, cross-linking catalysts, flame retardants, fillers and foaming agents.

The polyethylene based film structure comprising the combinations of layers disclosed herein can have a variety of thicknesses depending, for example, on the number of layers, the intended use of the film, and other factors. Multilayer films of the present disclosure, in some embodiments, have a thickness of 15 to 200 microns (typically, 30-100 microns). In some embodiments, depending for example on the end use application, the oriented polyethylene layer(s) can be corona treated or printed using techniques known to those of skill in the art.

Embodiments of the present disclosure also provide articles formed from the polyethylene based film structure as provided herein. Examples of such articles can include a pillow pouch, a 3-side sealed bag, a 4-side sealed bag and a stand-up pouch, as are known in the art. Other examples of such articles include packages, flexible packages, and pouches (besides stand-up pouches). In some embodiments, articles of the present disclosure can hold a liquid, a powder, a food product, or other items. Articles and packages of the present disclosure can be formed from the multilayer films or laminates disclosed herein using techniques known to those of skill in the art in view of the teachings herein.

Some embodiments of the disclosure will now be described in detail in the following Examples.

EXAMPLES

In the Examples, various terms and designations for materials were used including, for example, the following:

The biaxial Oriented Polyethylene (BOPE) film used in Examples is model Lightweight PE film (DL) having a thickness of 25 microns (after orientation), commercially available from Guangdong Decro Film New Materials CO. Ltd.

Test the melting point (Tm) of the oriented PE film using DSC (differential scanning calorimetry). Cut the oriented film into small pieces and load into sample cell in DSC Q2000 (TA Instruments) at 10 milligram. Run first heating at 10° C./min to 200° C. before running the cooling at 10° C./min to minus 80° C. Then run second heating at 10° C. to 200° C. again. The melting endothermal peak at the highest temperature is taken as the melting point (Tm) of the oriented PE film.

The testing of BOPE film follows the above provided method. The melting endothermal peak at the highest temperature is taken as the melting point (Tm) of the BOPE film. The Tm of BOPE provided in the examples is tested to be 126.2° C.

Blown PE Film. The blown PE film formulation is listed in Table 1. Use a Reifenhauser blown film line with BUR=2.1; Die gap=2.5 mm; Die diameter=500 mm; Output=300 kg/h; and haul-off speed=34.7 m/min to form the blown PE film from the formulation in Table 1 having a thickness of 50 μm.

TABLE 1

| Blown PE film formulations | | |
|---|---|---|
| Structure | | Formulation |
| Lamination layer | 15 μm | 75% LL0220 AA + 24.5% Lupolen 2420H + 0.5% PEA-3S PPA |
| Core layer | 20 μm | |
| Sealant layer | 15 μm | 75% ELITE AT 6202 + 24% Lotrene LDPE FD0274 + 1% PEA-35 PPA |

Percentages are weight percentages based on the total weight of the layer. LL0220 AA is a LLDPE available from Shanghai Secco. Lupolen 2420H is a LDPE available from LyondellBasell. PEA-3S PPA is a processing aid available AVI Polymer. ELITE™ AT 6202 is a LLDPE ethylene-octene copolymer available from The Dow Chemical Company. Lotrene LDPE FD0274 is a LDPE available from Qatar Petrochemical Examples are described using a BOPE/PE laminate of BOPE/Blown PE, on film and pouch performance. Laminate the BOPE film with the blown PE films to form the BOPE/PE laminate using a LABO Combi 400 laminator (Nordmeccanica Group). Set the line speed to 50 m/min with a solid adhesive amount of 3 gram per square meter (gsm). Use Adcote 563EA/CR750 (The Dow Chemical Company) for the adhesive. Cure the laminate in an oven at 50±1° C. for 3 days.

Use a J&B hot-tack Tester Model 4000 (Vived Management NV) to heat seal the films. Operate the J&B hot-tack Tester Model 4000 only at sealing mode without pulling with a 4 millimeter (mm) seal bar. Keep film sample strips at 25.4 mm, cut along MD, and seal along CD with fin seal mode (sealant layers of two films in contact with each other). Age all the sealed strips for 24 hours under controlled environment (23±2° C., 55±5 relative humidity) before testing for seal strength or shrinkage level.

Make pouches using a lab-scale sealing machine SL-02 (TMI) having exchangeable sealing jaws: 25.4 mm, 10 mm and 3.1 mm depth respectively. Make the pouches as 3-side sealed bags, with two CD side and one MD side sealed, respectively. Age the pouches for 24 hours under controlled environment (23±2° C., 55±5 relative humidity) before being observed.

For all above mentioned sealing operation, cover all sealing jaw surfaces with a Teflon coated web (Chukoh, 120 microns). Keep sealing pressure at 0.5 MPa and the dwell time at 0.5 seconds. Set the sealing temperatures by comparative (symmetrical) and inventive (asymmetrical) sealing conditions, respectively.

Figure 2:
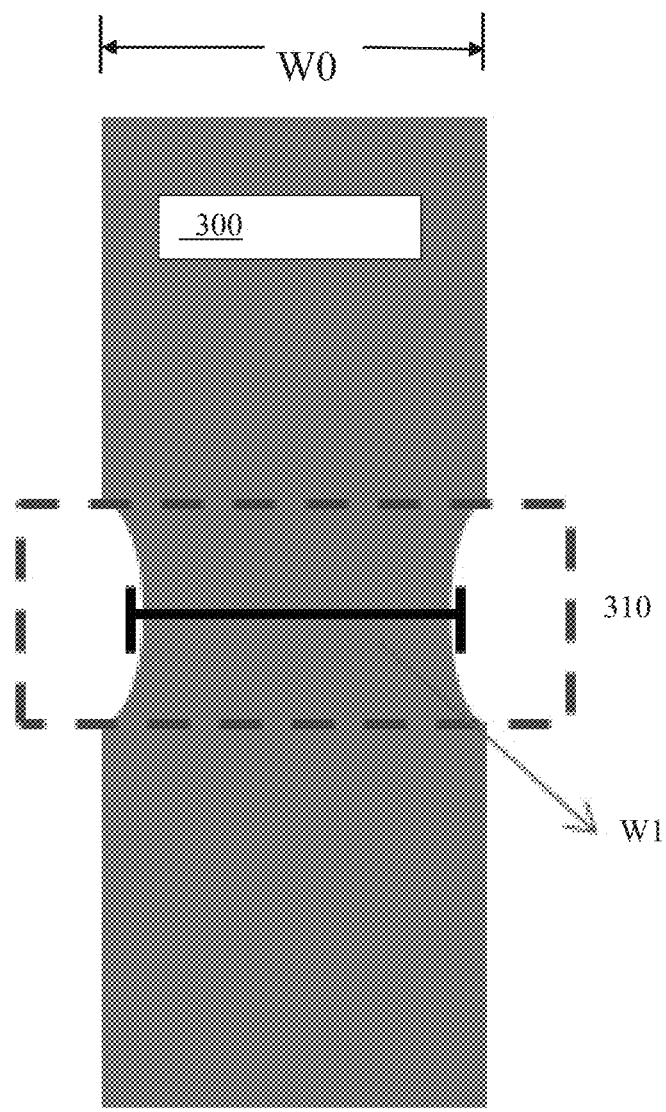
FIG. 2 is an illustration of a film strip showing a location where a shortest width of a seal area in the film strip is measured according to the test method provided in the Examples section of the present disclosure.

The deformation of the sealed films were investigated both qualitatively and quantitatively. The appearance of the sealed sample was evaluated with respect to shrinkage of the sealed area 310 and also the wrinkle of the whole film strip 300. To quantify the shrinkage, measure the shortest width of the film strip (distance between the tangent lines of the contour of the shrunk edge along CD), as shown in FIG. 2. Calculate the shrinkage ratio as:

$$S^H = (W0 - W1)/W0 \times 100$$

Where $S^H$ is the shrinkage ratio in parallel with the seal jaw length direction (CD); W0 is the original strip width; and W1 is the strip width after heat seal. Repeat the test for 3-8 samples for each data point.

Test seal strength on a tensile machine (Type5943, INSTRON) under T-peel with pulling speed of 500 mm/min. Test the film stripe samples directly. For the pouch samples, first cut perpendicularly through the sealed areas to obtain 25.4 mm (1 inch) stripes and then test. Clamp the sample on the two unsealed tails and peeled apart. Record max load as seal strength. Repeat the test for 3 samples for each data point.

Figure 3A:
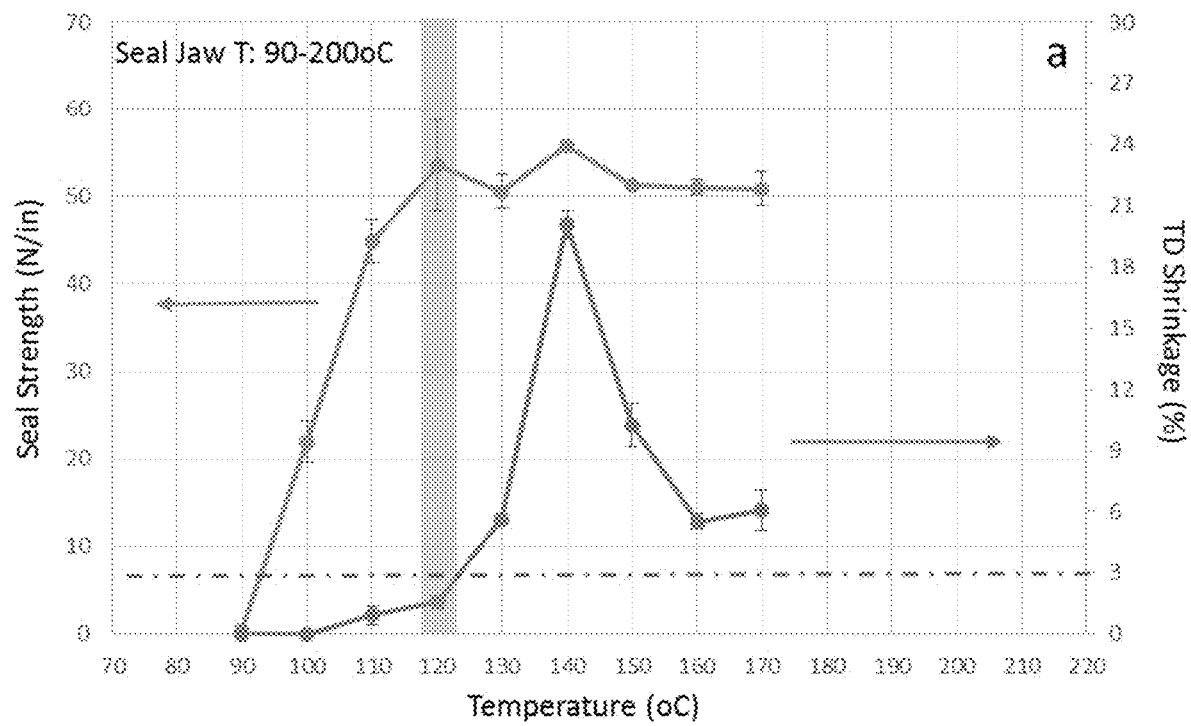
FIGS. 3A and 3B provide seal strength and TD shrink data as a function of sealing bar sealing temperatures for Comparative Example A (symmetrical or conventional sealing method where both sealing bars have the same temperature) and for Inventive Example 1 (asymmetrical sealing where each sealing bar has a temperature set according to the present disclosure).
Figure 3B:
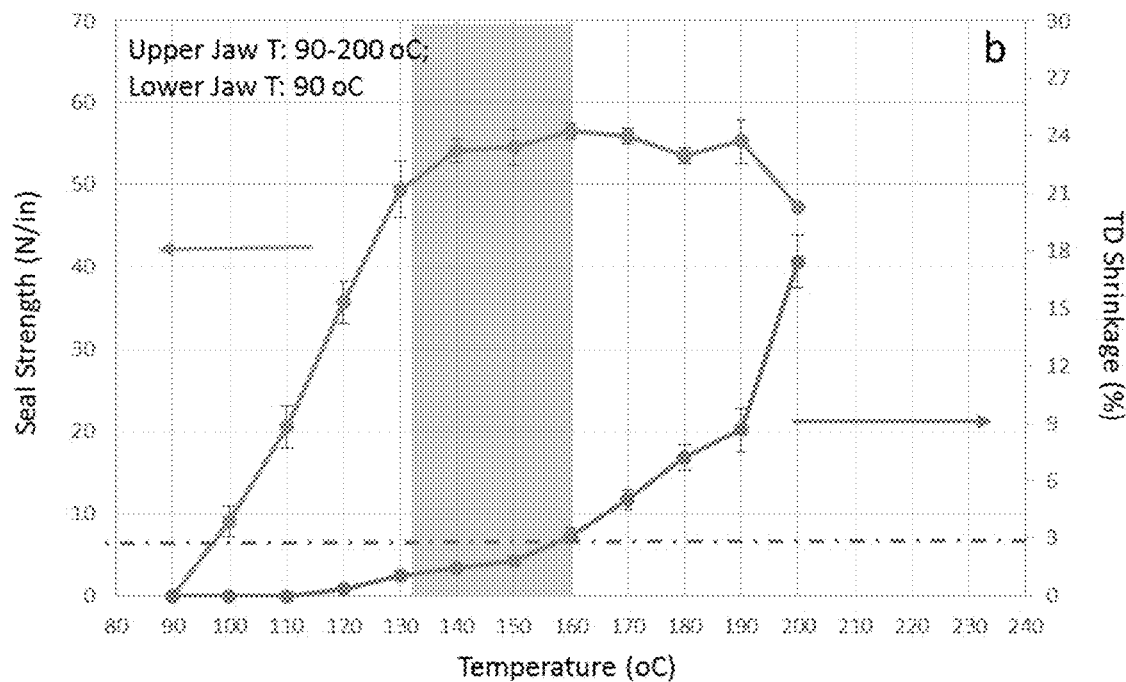

The heat sealing window for the BOPE/PE laminate is defined as the operation temperature range that gives adequate seal strength while not inducing unacceptable deformation of the film. Practically for pouch applications, a seal strength higher than 40 N/in is adequate and thus the temperature where the seal reaches this strength value is defined as the lower limit of the sealing window. More strictly this lower limit could be defined as the starting temperature where the strength reaches a plateau, as shown in FIGS. 3A and 3B. Observable wrinkling of the film is found to emerge at shrinkage level of 3% and thus the temperature where shrinkage reaches this level is defined as the upper limit of the sealing window.

The temperature setup in the comparative and inventive examples on films are summarized in Table 2 and Table 3, respectively. And the sealing window with respect of shrinkage level and seal strength shown in FIGS. 3A and 3B. The sealing window is shaded for comparison, according to seal strength reaching plateau while shrinkage level lower than 3%. It is found that by conventional (symmetrical) sealing condition as in Comparative Example A (FIG. 3A), hardly any sealing window was available. While by applying asymmetrical sealing condition, a sealing window broader than 25° C. was gained (FIG. 3B).

TABLE 2

Temperature (T) setup in Comparative Example A

| Upper Seal Bar T (oC.) | 90 | 100 | 110 | 120 | 130 | 140 | 150 | 160 | 170 |
|---|---|---|---|---|---|---|---|---|---|
| Lower Seal Bar T (oC.) | 90 | 100 | 110 | 120 | 130 | 140 | 150 | 160 | 170 |

TABLE 3

Temperature (T) setup in Inventive Example 1

| Upper Seal Bar T (oC.) | 90 | 100 | 110 | 120 | 130 | 140 | 150 | 160 | 170 | 180 | 190 | 200 | 210 |
|---|---|---|---|---|---|---|---|---|---|---|---|---|---|
| Lower Seal Bar T (oC.) | 90 | 90 | 90 | 90 | 90 | 90 | 90 | 90 | 90 | 90 | 90 | 90 | 90 |

Figure 4A:
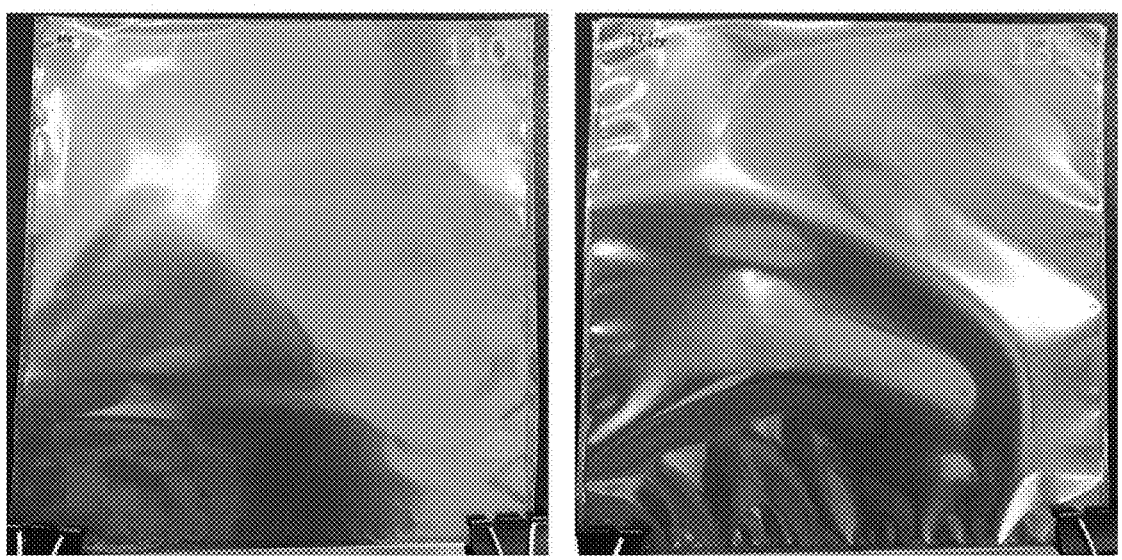
FIGS. 4A and 4B provide images of Comparative Example B having seals formed using conventional sealing condition Inventive example 2: Asymmetrical sealing condition FIG. 3 Images of 3-Side sealed pouches
Figure 4B:

Comparative Example B and Inventive Example 2 were conducted at conventional and asymmetrical sealing conditions, to make full-PE pouches from the BOPE/PE laminate. The sealing conditions are shown in Table 4 and Table 5, respectively. FIGS. 4A and 4B show the images of the pouches made in Comparative Example B (FIG. 4A) and Inventive Example 2 (FIG. 4B), respectively. In FIG. 4A, the pouch made by conventional sealing at sealing temperature of 110° C. (left image) is strong enough (seal strength just reached 40N/in), and the appearance was good without observable wrinkling around sealed areas. The pouches made at 135° C. (right image) already showed notable shrinkage and wrinkling at all the sealed sides. The wrinkle actually emerged at around 125° C., and the sealing window is less than 15° C. In FIG. 4B, the pouch made by asymmetrical sealing at sealing temperature of 125° C. (left image) is strong enough (seal strength just reached 40N/in), and the appearance was good without observable wrinkling around sealed areas. The pouches made at 160° C. (middle image) only showed a little slight wrinkling at all the sealed sides. The pouches made at 190° C. (right image) already showed notable shrinkage and wrinkling at all the sealed sides, which was comparable with the appearance of the pouch made at 135° C. of conventional sealing. The wrinkle actually emerged at around 170° C., and the sealing window is around 45° C.

TABLE 4

Temperature (T) setup in Comparative Example B

| Upper Seal Bar T (oC) | 110 | 135 |
|---|---|---|
| Lower Seal Bar T (oC) | 110 | 135 |

TABLE 5

Temperature (T) setup in Inventive Example 2

| Upper Seal Bar T (oC) | 125 | 160 | 190 |
|---|---|---|---|
| Lower Seal Bar T (oC) | 90 | 90 | 90 |

What is claimed is:

1. A method of forming a seal with a polyethylene based film structure, comprising:
    providing the polyethylene based film structure, wherein the polyethylene based film structure has at least one layer formed with an oriented polyethylene having a predetermined melting temperature ($T_m$);
    providing a conductive heat sealing device having a first sealing bar and a second sealing bar opposing the first sealing bar, wherein the first sealing bar and a second sealing bar provide heat to form the seal;
    operating the first sealing bar of the conductive heat sealing device at a first operating temperature of at least 10 degrees Celsius (° C.) below the $T_m$ of the oriented polyethylene forming at least one layer in the polyethylene based film structure;
    operating the second sealing bar of the conductive heat sealing device at a second operating temperature of at least 15° C. higher than the operating temperature of the first sealing bar; and
    forming the seal with the polyethylene based film structure between the opposing first sealing bar and second sealing bar of the conductive heat sealing device.

2. The method of claim 1, wherein operating the first sealing bar of the conductive heat sealing device at the first operating temperature includes operating the first sealing bar of the conductive heat sealing device at the first operating temperature of at least 15° C. below the $T_m$ of the oriented polyethylene forming at least one layer in the polyethylene based film structure; and operating the second sealing bar of the conductive heat sealing device at the second operating temperature includes operating the second sealing bar of the conductive heat sealing device at the second operating temperature of at least 25° C. higher than the operating temperature of the first sealing bar.

3. The method of claim 1, wherein providing the polyethylene based film structure having the at least one layer formed with the oriented polyethylene includes providing the polyethylene based film structure having at least one layer formed with a biaxial oriented polyethylene, wherein biaxially oriented polyethylene is oriented in the machine direction at a draw ratio from 2:1 to 9:1 and in the cross direction at a draw ratio from 1:1 to 10:1.

4. The method of claim 1, wherein providing the polyethylene based film structure having the at least one layer formed with the oriented polyethylene includes providing the polyethylene based film structure having at least one layer formed with a monoaxial oriented polyethylene.

5. The method of claim 1, wherein the oriented polyethylene has a density of 0.910 to 0.970 g/cm³; or wherein the oriented polyethylene comprises a linear low density or medium density polyethylene having a density of 0.910 to 0.940 g/cm³.

6. The method of claim 1, wherein providing the polyethylene based film structure includes providing the polyethylene based film structure having a thickness of 30 to 200 micrometer (μm).

7. The method of claim 1, wherein providing the polyethylene based film structure includes providing the polyethylene based film structure formed only with the oriented polyethylene.

8. The method of claim 1, wherein providing the polyethylene based film structure includes providing the polyethylene based film structure having a monolayer structure formed only with one of the at least one oriented polyethylene layer.

9. The method of claim 1, wherein providing the polyethylene based film structure includes providing the polyethylene based film structure having a multilayer structure formed with at least one layer formed with the oriented polyethylene.

10. The method of claim 9, wherein the at least one layer formed with the oriented polyethylene forms a skin layer of the polyethylene based film structure.

11. The method of claim 9, wherein the multilayer structure further includes an adhesive layer and a sealant layer, wherein the sealant layer is laminated to the at least one layer formed with the oriented polyethylene by the adhesive layer.

12. The method of claim 11, wherein the second operating temperature for the second sealing bar is greater than the heat seal initiation temperature of the sealant layer.

13. The method of claim 1, wherein providing the polyethylene based film structure having the at least one layer formed with the oriented polyethylene includes providing the polyethylene based film structure wherein at least 50 percent of structural units of the polyethylene based film structure is from polyethylene.

14. The method of claim 1, wherein forming the seal with the surfaces of the polyethylene based film structure between the first sealing bar and the second sealing bar of the conductive heat sealing device includes contacting the polyethylene based film structure with the first sealing bar and the second sealing bar of the conductive heat sealing device for a sealing dwell time in a range of 0.1 to 3 seconds to form the seal.

15. An article comprising the polyethylene based film structure formed using the method of claim 1.

16. The article of claim 15, wherein the seal formed with the polyethylene based film structure retains at least 99 percent of its original surface area prior to forming the seal.

17. The article of claim 15, wherein the seal formed with the polyethylene based film structure has a surface area that is at least 90 percent of a surface area of the first sealing bar and the second sealing bar that contacts the polyethylene based film structure while forming the seal.

18. The article of claim 15, wherein the seal has a seal strength of 5 N/inch (1.97 N/cm) to 25 N/inch (9.84 N/cm) or.

19. The article of claim 15, wherein the seal has a seal strength of 20 N/inch (7.87 N/cm) to 200 N/inch (78.74 N/cm).

20. The article of claim 15, wherein the article is selected from the group consisting of a pillow pouch, a 3-side sealed bag, a 4-side sealed bag and a stand-up pouch.

* * * * *